United States Patent [19]
Idage et al.

[11] Patent Number: 5,340,908
[45] Date of Patent: Aug. 23, 1994

[54] PROCESS FOR THE PREPARATION OF AROMATIC POLYESTERS

[75] Inventors: Bhaskar B. Idage; Nayaku N. Chavan; Sudhakar S. Mahajan; Swaminathan Sivaram, all of Pune, India

[73] Assignee: Council of Scientific & Industrial Research, New Delhi, India

[21] Appl. No.: 41,700

[22] Filed: Apr. 1, 1993

[51] Int. Cl.$^5$ .............................................. C08G 63/78
[52] U.S. Cl. .................................. 528/275; 528/176; 528/180; 528/272; 528/279; 528/283
[58] Field of Search ............... 528/176, 272, 275, 279, 528/283, 180

[56] References Cited

U.S. PATENT DOCUMENTS

| | | | |
|---|---|---|---|
| 3,553,167 | 1/1971 | Schnell | 528/176 |
| 4,137,278 | 1/1979 | Lemper et al. | 525/444 |
| 4,327,206 | 4/1982 | Jackson, Jr. et al. | 528/179 |

*Primary Examiner*—John Kight, III
*Assistant Examiner*—Terressa Mosley
*Attorney, Agent, or Firm*—Ladas & Parry

[57] ABSTRACT

This invention relates to a process for the preparation of aromatic polyester(s) having an intrinsic viscosity greater than 0.4 dL/g in chloroform at 30° C. which comprises (a) reacting diarylesters of tere and isophthalic acid(s) and dihydric phenol(s) in the melt phase in an inert atmosphere in the presence of a catalyst selected from alkoxides of Group IV B metals and derivatives of Group IV A metals and in the presence of an organic solvent at a temperature in the range of 100°–300° C. to form a prepolymer having intrinsic viscosity in the range of 0.1 to 0.3 dL/g in chloroform at 30° C. (b) purifying the prepolymer using conventional solvent extraction methods and (c) Polycondensing the purified prepolymer at a temperature in the range of 300°–350° C. in presence of a catalyst selected from alkoxides of Group IVB metals and derivatives of Group IVA metals under reduced pressure.

14 Claims, No Drawings

PROCESS FOR THE PREPARATION OF AROMATIC POLYESTERS

This invention relates to an improved process for the preparation of aromatic polyesters. The present invention particularly relates to the use of aryl esters and dihydric phenols for the production of aromatic polyesters.

Aromatic polyester is a class of polyesters generally made from bisphenol(s) and an aromatic diacid(s) particularly mixtures of terephthalic and isophthalic acids. These polyesters are high temperature, high performance thermoplastic polymers with a good combination of thermal and mechanical properties. In cost, performance and processability, they occupy a niche between polycarbonate and polysulfone. They are processed by molding, extrusion and film forming techniques for conversion of it to different types of useful products.

Three major processes have been described in the literature for preparation of aromatic polyester.

(1) An interfacial polycondensation of terephthaloyl-/isophthaloyl chloride with bisphenol-A (BPA) under phase transfer conditions. In this context reference may be made to the following literature. Japan Pat. 82-96,017; 59-223, 721; 59-223, 722; 59-219, 326; 60-23; 420 to Mitsubishi Gas Chemical Company, Japan.

(ii) A melt polycondensation process of bisphenol diacetate with terephthalic/isophthalic acid in presence of a catalyst. In this context reference may be made to the following literature. European Pat. Appln. 35,269; 39,845; 97,970; U.S. Pat. Nos. 4,374,239; 4,386,186 to Union Carbide Corporation, U.S.A.; U.S. Pat. No. 4,330,668 to Asahi Chemical Co., Japan; U.S. Pat. No. 4,485,230 to Phillips Petroleum Co., U.S.A.

(iii) A melt polycondensation of diphenyl phthalates with bisphenol-A in presence of a catalyst. In this context reference may be made to the following literature. European Pat. Appl. 35,895; 35,897; U.K. Pat. No. 2,085,450 to Hooker Chemicals and Plastic Corporation, U.S.A.

One such melt polycondensation process is the diacetate process. In the diacetate process, a dihydric phenol is converted to its diester derivative, which is then reacted with an aromatic dicarboxylic acid to yield aromatic polyester. In the diacetate process, it is generally observed that sublimation of diacid occurs when a diester of dihydric phenol is reacted with an aromatic dicarboxylic acid in the molten state. This upsets the stoichiometry of the reactants and results in products of insufficient molecular weight. A variety of solvents have been suggested in the prior literature to reduce sublimation of reactants. The preferred organic solvents are a diphenylether compound as described in U.S. Pat. No. 4,294,956; a cycloaliphatic substituted aromatic or heteroaromatic compound, as described in U.S. Pat. No. 4,294,957 and a halogenated and/or etherated substituted aromatic or heteroaromatic compound, as described in U.S. Pat. No. 4,374,239 or mixture of these. Yet another problem associated with production of aromatic polyesters by diacetate process is the formation of carboxylic acid as a by-product of the reaction of phenol diacetate with an aromatic dicarboxylic acid.

Prior literature reports one variation of the diacetate process involving the reaction of a diphenol diacetate and dimethyl ester of aromatic diacid [Bier, G., "Polyarylates (Polyesters from aromatic dicarboxylic acids and bisphenols)". Polymer 15, August 1974, pp 527-535]. In this sequence, condensation would occur with the liberation or methyl acetate. However, the reaction is reported to yield only oligomers. Furthermore, methyl acetate cannot be easily recycled in the process. German Offen. DE 3,824,069, January 1990 describes a variation of the diacetate process. In the patented process dialkyl esters of aromatic dicarboxylic acids are heated with bisphenol diesters at 260°-350° C. in presence of dibutyltindilaurate catalyst. The resultant polyesters gave a relative viscosity of 1.153 which was increased to 1.418 by heating the polyester at 300° C./2 mbar for 3 hours.

Another melt polycondensation process is the diphenate process. The reaction between a diaryl ester of an dicarboxylic acid(s) and an aromatic diphenol(s) results in high molecular weight aromatic polyester(s). The ester intercharge reaction in the diphenate process can proceed in the absence of a catalyst but the rate can be increased by using catalysts [U.S. Pat. No. 3,553,167 (1971), Ger. Pat. 2,232,877 (1974), U.S. Pat. No. 3,972,852 (1974), U.S. Pat. No. 4,465,819 (1984)].

The diphenate process compares favourably with the diacetate process with respect to product quality. However, the limiting factor for this process is the preparation (availability) of the diphenyl ester derivative which is very expensive.

The main object of the present invention is to provide an improved process for the preparation of aromatic polyester(s) using a simple alkyl ester of aromatic dicarboxylic acid(s) and dihydric phenol(s) by melt polycondensation technique. Such as reaction has no precedence in the prior art.

Accordingly, the present invention provides an improved process for the preparation of aromatic polyester which comprises of two steps. The first step comprises of preparation of aromatic polyester prepolymer having intrinsic viscosity in the range of 0.1 to 0.3 dL/g in chloroform by reacting the dimethylesters of tere- and isophthalic acid(s) and dihydric phenol(s) in the melt phase in the presence of solvent and catalyst.

The dihydric phenols employable may be bisphenol-A, halosubstituted bisphenol-A, alkylsubstituted bisphenol-A, hydroquinone, resorcinol and various types of other polyphenols.

The dialkyl esters employable may be dimethylterephthalate, dimethylisophthalate and mixtures thereof, as well as naphthalenedicarboxylic acid esters and alkyl substituted homologs of such dicarboxylic acid esters wherein the alkyl group contain 1 to 4 carbon atoms.

Mixtures of any ratio of diesters of isophthalic acid and terephthalic can be used. In these mixtures the mole or weight ratio can range from 95:5 to 5:95. Preferably, the ratio in such mixtures is in the range of about 90:10 to 30:70 for more amorphous properties. More preferred ratio of about 70:30 to 30:70 produce amorphous polyesters.

The catalyst employed may include alkoxides of Gr.IVB metals and derivatives of Gr. IVA metals. These may be preferably titanium butoxide, titanium propoxide, titanium phenoxide, zirconium butoxide, dibutyltin oxide, dibutyltin diesters, tin phenoxide, silicon phenoxide etc. The amount of catalyst employed may be quite low and it ranges from 0.1 mol % to 0.5 mol % with reference to dihydric phenol. The inert gas may be selected from gases such as nitrogen, argon or any other inert gases.

The typical solvents used are diphenylether, chlorinated biphenyls, aromatic sulfones, sulfolane, -lactones and the like.

The prepolymer preparation reaction proceeds in a programmed manner. The oligomerization may be conducted at different pressures ranging from atmospheric pressure to sub-atmospheric pressure. Generally one atmosphere (760 mm of Hg) is maintained during the initial phase and subsequently the pressure is reduced to a value in the order of 1.0 to 01 mm of Hg or even lower in a phased manner.

The temperatures of reaction may range from 100° to 300° C. or higher. Often temperature profile of 140° to 280° C. is ideal for smooth running of the polymerization reaction. Reacting time may be varied from 2 to 20 hrs, preferably between 6 to 10 hrs range.

The prepolymer derived from the process exhibit intrinsic viscosities in the range of 0.1 to 0.3 dL/g in chloroform at 30° C.

The prepolymer obtained is then subjected to purification for removal of undesired products which apparently interfere in the second stage. This is done by solvent extraction method. The undesired bisphenol-A(BPA), dimethylterephthalate (DMT) and dimethylisophthalate (DMI) from the polyarylate prepolymer were removed by soxhlet extraction with methanol for about 8 to 24 hrs.

The second step consists of melt polycondensation of purified polyarylate prepolymer of 300°–350° C. in presence of a catalyst under reduced pressure in order to increase its intrinsic viscosity greater than 0.4 dL/g in chloroform at 30° C. The catalysts may be selected from alkoxides of Group IVB metals and derivatives of Group IVA metals.

Accordingly, the present invention provides an improved process for the preparation of aromatic polyester(s) having an intrinsic viscosity greater than 0.4 dL/g in chloroform at 30° C. which comprises (a) reacting dialkyl esters of tere and isophthalic acid(s) and dihydric phenol(s) in the melt phase in an inert atmosphere in the presence of a catalyst selected from alkoxides of Group IV B metals and derivatives of Group IV A metals and in the presence of an organic solvent at a temperature in the range of 100°–300° C. to form a prepolymer having intrinsic viscosity in the range of 0.1 to 0.3 dL/g in chloroform at 30° C. (b) purifying the prepolymer using conventional solvent extraction methods and (c) polycondensing the purified prepolymer at a temperature in the range of 300°–350° C. in presence of a catalyst selected from alkoxides of Group IVB metals and derivatives of Group IVA metals under reduced pressure.

The following examples will serve to illustrate the present invention more specifically and should not be construed to limit the scope of the present invention.

EXAMPLE 1

Preparation of Prepolymer —A three neck, 250 ml cylindrical glass reactor was equipped with a mechanical stirrer, a nitrogen inlet and a vacuum jacketed Vigreus column and distillation head. The reactor was charged with 0.02 mol of bisphenol-A, 0.01 mol of dimethylterephthalate, 0.01 mol of dimethylisophthalate and 12 mL of diphenylether. The system was purged with dry nitrogen for 30 min. at room temperature. Then 0.03 mL (0.5 mol % based on BPA) of titanium isopropoxide was added into the reactor. The reactants were heated at 260° C. in a dry nitrogen atmosphere for 3.0 hrs. The by-product methyl alcohol began to distill at this point. At the end of three hours period, about 90% methyl alcohol was collected. Then the temperature was increased to 290°–300° C. and a partial vacuum (150 mm of Hg) was applied to the system. Maintaining the temperature at 290°–300° C., the pressure was decreased sequentially in the following way, 150 mm, 0.5 hour; 100 mm, 0.5 hour; 50 mm, 0.5 hour; 1 mm, 1 hour. During this sequence it was observed that solvent (DPE) was removed almost quantitatively along with residual methyl alcohol (by-product). The unreacted BPA, DMT and DMI from the polyarylate prepolymer were removed by soxhlet extraction with methanol for about 8 to 24 hours. The polyarylate prepolymer obtained in 98% yield was slightly yellow in colour and its intrinsic viscosity measured in chloroform at 30° C. was 0.3 dL/g.

Preparation of Polymer: To a cylindrical glass reactor (100 ml) fitted with a vacuum adapter was added 2 g of the prepolymer along with 0.004 g (0.5 wt. % based on prepolymer) of dibutyltindilaurate. The pressure in the reactor was reduced to <0.5 mm Hg. After 5 min at ambient temperature, the reactor was heated to 300°–350° C. and the temperature was maintained for about 30 min. Then the reactor was cooled to ambient temperature. The material appeared as a foamy mass having off-white colour. Its intrinsic viscosity measured in chloroform at 30° C. was 0.35 dL/g.

EXAMPLE 2

Preparation of Prepolymer: In the same reactor as in example 1 were charged 0.02 mol of bisphenol-A, 0.01 mol of dimethylterephthalate, 0.01 mol of dimethylisophthalate and 12 ml of diphenylether. The system was purged with dry nitrogen for 30 min. at room temperature. Then 0.0249 g (0.5 mol % based on BPA) of dibutyltin oxide was added into the reactor. The reactants were heated at 260° C. in a dry nitrogen atmosphere for 3 hours. At the end of three hours period about 70% methyl alcohol (by-product) was collected. Then the temperature was increased to 290°–300° C. and a partial vacuum 150 mm Hg was applied to the system. Maintaining the temperature at 290°–300° C., the pressure was decreased sequentially, 150 mm, 0.5 hour; 100 mm, 0.5 hour; 50 mm, 0.5 hour; 1 mm, 1 hour. The system was allowed to cool to ambient temperature. The polyarylate prepolymer was purified by following the same procedure as described in example 1. The prepolymer obtained in 92% yield was white colour and its intrinsic viscosity measured in chloroform at 30° C. was 0.13 dL/g. Preparation of Polymer: In the same reactor as in example 1, were added 2 g of the prepolymer along with 0.004 g (0.5 wt. % based on prepolymer) of dibutyltindilaurate. The pressure in the reactor was reduced to <0.5 mm Hg. After 5 min at ambient temperature, the reactor was heated to 300°–350° C. and the temperature was maintained for about 30 min. Then the reactor was cooled to ambient temperature. The material appeared as a foamy mass having offwhite colour. Its intrinsic viscosity measured in chloroform at 30° C. was 0.45 dL/g.

EXAMPLE 3

Preparation of Prepolymer: In the same reactor as in example 1, were charged 0.02 mol of bisphenol-A, 0.01 ml of dimethylterephthalate, 0.01 mol of dimethylisophthalate and 12 mL of diphenylether. The system was purged with dry nitrogen for 30 min. at room temperature. Then 0.059 mL (0.5 mol % based on BPA) of dibutyltindilaurate was added into the reactor. The reactants were heated at 260° C. in a dry nitrogen atmosphere for 3 hours. At the end of three hours period about 70% of methyl alcohol (by-product) was collected. Then the temperature was increased to 290°-300° C. and a partial vacuum 150 mm of Hg was applied to the system. Maintaining the temperature at 290°-300° C., the pressure was decreased sequentially, 150 mm, 0.5 hour; 100 mm, 0.5 hour; 50 mm, 0.5 hour; 1 mm, 1 hour. The system was allowed to cool to ambient temperature. The polyarylate prepolymer was purified by following the same procedure as described in example 1. The prepolymer obtained in 84% yield was white in colour and its intrinsic viscosity measured in chloroform at 30° C. was 0.14 dL/g. Preparation of Polymer: In the same reactor as in example 1, were added 2 g of the prepolymer along with 0.004 g (0.5 wt. % based on prepolymer) of dibutyltindilaurate. The pressure in the reactor was reduced to <0.5 mm Hg. After 5 min at ambient temperature, the reactor was heated to 300°-350° C. and the temperature was maintained for about 30 min. Then the reactor was cooled to ambient temperature. The material appeared as a foamy mass having offwhite colour. Its intrinsic viscosity measured in chloroform at 30° C. was 0.45 dL/g.

EXAMPLE 4

Preparation of Prepolymer: In the same reactor as in example 1, were charged 0.02 mol of bisphenol-A, 0.01 mol of dimethylterephthalate, 0.01 mol of dimethylisophthalate and 12 ml of diphenylether. The system was purged with dry nitrogen for 30 min. at room temperature. Then 0.0741 g (0.5 mol % based on BPA) of titanium butoxide was added into the reactor. The reactants were heated at 260° C. in a dry nitrogen atmosphere for 3 hours. At the end of three hours period about 55% methyl alcohol (by-product) was collected. Then the temperature was increased to 290°-300° C. and a partial vacuum 150 mm of Hg was applied to the system. Maintaining the temperature at 290°-300° C., the pressure was decreased sequentially, 150 mm, 0.5 hour; 100 mm, 0.5 hour; 50 mm, 0.5 hour; 1 mm, 1 hour. The system was allowed to cool to ambient temperature. The polyester prepolymer was purified by following the same procedure as described in example 1. The prepolymer obtained in 83% yield was offwhite in colour and its intrinsic viscosity measured in chloroform at 30° C. was 0.24 dL/g.

Preparation of Polymer: In the same reactor as in example 1, were add 2 g of the prepolymer along with 0.004 g (05 wt % based on prepolymer) of dibutyltindilaurate. The pressure in the reactor was reduced to <0.5 mm Hg. After 5 min at ambient temperature, the reactor was heated to 300°-350° C. and the temperature was maintained for about 30 min. Then the reactor was cooled to ambient temperature. The material appeared as a foamy mass having offwhite colour. Its intrinsic viscosity measured in chloroform at 30° C. was 0.35 dL/g.

EXAMPLE 5

Preparation of Prepolymer: In the same reactor as in example 1, were charged 0.02 mol of bisphenol-A, 0.01 mol of dimethylterephthalate, 0.01 mol of dimethylisophthalate and 12 mL of diphenylether. The system was purged with dry nitrogen for 30 min. at room temperature. Then 0.0420 g (0.5 mol % based on BPA) of titanium phenoxide was added into the reactor. The reactants were heated at 260° C. in a dry nitrogen atmosphere for 3 hours. At the end of three hours period about 70% methyl alcohol (by-product) was collected. Then the temperature was increased to 290°-300° C. and a partial vacuum 150 mm of Hg was applied to the system. Maintaining the temperature at 290°-300° C., the pressure was decreased sequentially 150 mm, 0.5 hour; 100 mm, 0.5 hour; 50, mm. 0.5 hour, 1 mm, 1 hour. The system was allowed to cool to ambient temperature. The polyester prepolymer was purified by following the same procedure as described in example 1. The prepolymer obtained in 70% yield was offwhite in colour and its intrinsic viscosity measured in chloroform at 30° C. was 0.18 dL/g.

Preparation of Polymer: In the same reactor as in example 1, were add 2 g of the prepolymer along with 0.004 g (05 wt % based on prepolymer) dibutyltindilaurate. The pressure in the reactor was reduced to <0.5 mm Hg. After 5 min, at ambient temperature, the reactor was heated to 300° -350° C. and the temperature was maintained for about 30 min. Then the reactor was cooled to ambient temperature. The material appeared as a foamy mass having offwhite colour. Its intrinsic viscosity measured in chloroform at 30° C. was 0.45 dL/g.

EXAMPLE 6

Preparation of Prepolymer: In the same reactor as in example 1, were charged 0.02 mol of bisphenol-A, 0.01 mol of dimethylterephthalate, 0.01 mol of dimethylisophthalate and 12 mL of tetramethylene sulfone (sulfolane). The system was purged with dry nitrogen for 30 min. at room temperature. Then 0.03 ml (0.5 mol% based on BPA) of titanium isopropoxide was added into the reactor. The reactants were heated at 280° C. in a dry nitrogen atmosphere for 3 hours. At the end of three hours period about 70% methyl alcohol (by-product) was collected. Then the temperature was increased to 290°-300° C. and a partial vacuum 150 mm of Hg was applied to the system. Maintaining the temperature at 290°-300° C., the pressure was decreased sequentially, 150 mm, 0.5 hour; 100 mm, 0.5 hour; 50 mm. 0.5 hour, 1 mm, 1 hour. The system was allowed to cool to ambient temperature. The polyester prepolymer was purified by following the same procedure as described in example 1. The prepolymer obtained in 62% yield was offwhite in colour and its intrinsic viscosity measured in chloroform at 30° C. was 0.25 dL/g.

Preparation of Polymer: In the same reactor as in example 1, were add 2 g of the prepolymer along with 0.004 g (05 wt % based on prepolymer) of dibutyltindilaurate. The pressure in the reactor was reduced to <0.5 mm Hg. After 5 min at ambient temperature, the reactor was heated to 300°-350° C. and the temperature was maintained for about 30 min. Then the reactor was cooled to ambient temperature. The material appeared as a foamy mass having offwhite colour. Its intrinsic viscosity measured in chloroform at 30° C. was 0.30 dL/g.

The main advantages of the invention are:

The present process involves in reaction of diphenol and the dimethyl ester of aromatic diacid in presence of a catalyst. In this sequence, condensation occurs with the liberation of methyl alcohol. Since methyl alcohol is a low boiling compound it can be removed conveniently and efficiently from the reaction to yield high molecular weight polyester. The recovered methyl alcohol can be directly recycled in the process for the esterification of terephthalic/isophthalic acid. This is an advantage over the conventional diacetate process for the production of aromatic polyester. The residual acetic anhydride in the final product from diacetate process affects the colour and thermal stability. On the contrary, the present alkyilester derivatives of aromatic dicarboxylic acids have lower melting point, higher solubility in diols and can usually be obtained at a higher purity grades than the corresponding acids and therefore often allows the production of better quality products and easier process control.

We claim:

1. A process for the preparation of aromatic polyester(s) having an intrinsic viscosity greater than 0.4 dL/g in chloroform at 30° C. which comprises.
   (a) reacting a dialkylester of terephthalic or isophthalic acid or a mixture thereof and dihydric phenol(s) in the melt phase in an inert atmosphere in the presence of a catalyst selected from alkoxides of Group IV B metals and derivatives of Group IV A metals and in the presence of an organic solvent at a temperature in the range of 100°–300° C. to form a prepolymer having intrinsic viscosity in the range of 0.1 to 0.3 dL/g in chloroform at 30° C.
   (b) purifying the prepolymer using conventional solvent extraction methods and
   (c) polycondensing the purified prepolymer at a temperature in the range of 300°–350° C. in presence of a catalyst selected from alkoxides of Group IVB metals and derivatives of Group IVA metals under reduced pressure.

2. A process as claimed in claim 1 wherein the dihydric phenol is selected from the group consisting of bisphenol-A, halosubstituted bisphenol-A, alkyl substituted bisphenol-A, hydroquinone, and resorcinol.

3. A process as claimed in claim 1 wherein the dialkyl esters of dicarboxylic acids employed are selected from the group consisting of alkyl esters of terephthalic acid, isophthalic acid, a naphthalene dicarboxylic acid and mixtures thereof and wherein the alkyl group containing 1 to 4 carbon atoms.

4. A process as claimed in claim 1 wherein the mixture of dialkyl diesters of isophthalic acid and terephthalic acid is used and their amount ranges from 95:5 to 5:95.

5. A process as claimed in claim 1 wherein the catalyst is selected from the group consisting of titanium butoxide, titanium propoxide, titanium phenoxide, zirconium butoxide, dibutyltin oxide, dibutyltin diesters, tin butoxide, silicon phenoxide.

6. A process as claimed in claim 1 wherein the amount of catalyst used ranges from 0.1 mole % to 0.5 mole % with reference to the dihydric phenol in step (a).

7. A process as claimed in claim 1 wherein the amount of catalyst used ranges from 0.1 to 0.5 wt % in step (c).

8. A process as claimed in claim 1 wherein the inert gas is selected from the group consisting nitrogen and argon.

9. A process as claimed in claim 1 wherein in the reaction a pressure ranging from atmospheric to subatmospheric pressure is maintained.

10. A process as claimed in claim 1 wherein the pressure used ranges from one atmospheric (760 mm of Hg) initially and subsequently reduced to 1.0 to 0.1 mm of Hg or even lower in a phased manner in step (a).

11. A process as claimed in claim 1 wherein the solvent employed in step (a) is selected from the group consisting of diphenylester, chlorinated biphenyls, aromatic sulphones, sulfolane and lactones.

12. A process as claimed in claim 1 wherein the prepolymer is purified by soxhlet extraction with methanol.

13. A process as claimed in claim 1 wherein the purified prepolymer is heated at a temperature 300°–350° C. under reduced pressure 0.1 to 0.5 mm of Hg in step (c).

14. An improved process for the preparation of aromatic polyester(s) having an intrinsic viscosity greater than 0.4 dL/g in chloroform at 30° C. as herein described with reference to the examples.

* * * * *